C. W. HUNT, DEC'D.
K H & C W. HUNT & G. S. HUMPHREY, EXECUTORS.
MOTOR TRUCK.
APPLICATION FILED DEC. 30, 1910.

1,020,607. Patented Mar. 19, 1912.

Witnesses: Inventor
Charles Wallace Hunt
By his Attorneys
Redding, Greeley & Austin

2
UNITED STATES PATENT OFFICE.

CHARLES W. HUNT, OF NEW YORK, N. Y.; KATHARINE H. HUNT, CHARLES WALLACE HUNT, AND GEORGE S. HUMPHREY EXECUTORS OF SAID CHARLES W. HUNT, DECEASED.

MOTOR-TRUCK.

1,020,607.

Specification of Letters Patent. Patented Mar. 19, 1912.

Application filed December 30, 1910. Serial No. 600,008.

*To all whom it may concern:*

Be it known that I, CHARLES WALLACE HUNT, a citizen of the United States, residing in Stapleton, in the borough of Richmond of the city of New York, in the State of New York, have invented certain new and useful Improvements in Motor-Trucks, of which the following is a specification, reference being had to the accompanying drawing, forming a part hereof.

This invention relates to motor trucks for railways and especially to motor trucks for mine, dock and other railways, the cars of which are comparatively small so that it is desirable that the driving wheels of the truck shall carry as much as possible, within reasonable limits, of the load superimposed upon the truck for the purpose of obtaining the maximum tractive effort, while the gage of the track is narrow, the radius of curves is short and the roadbed sometimes uneven, so that each truck must have considerable flexibility.

The object of the invention is to produce an improved motor truck which will meet the requirements of use imposed by the conditions referred to.

The invention will be more fully explained hereinafter with reference to the accompanying drawing in which an embodiment thereof is illustrated and in which—

Figure 1:
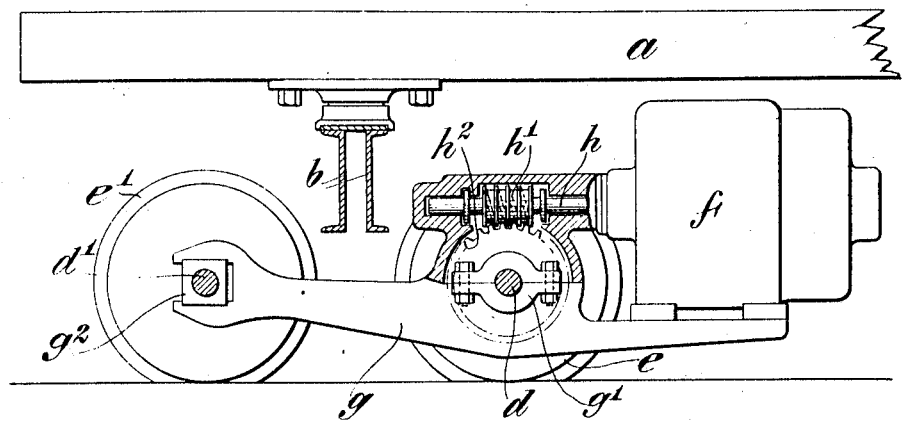
Figure 2:
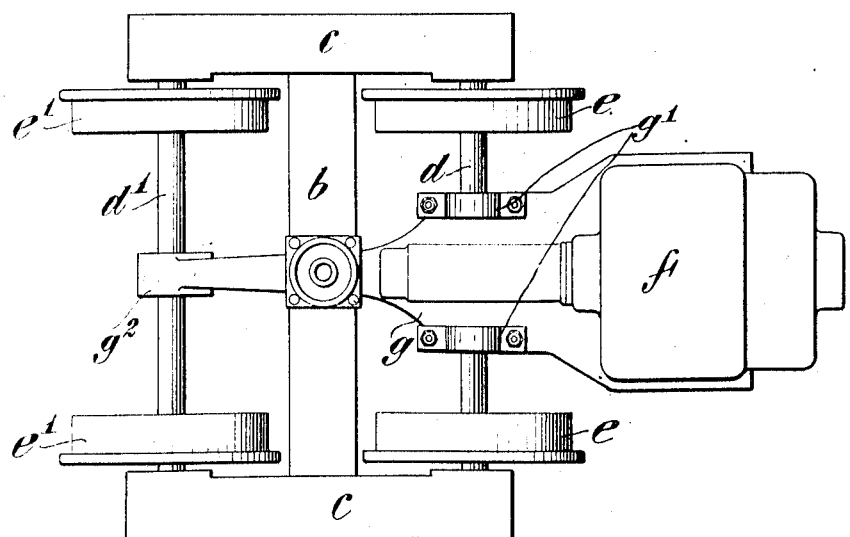
Figure 3:
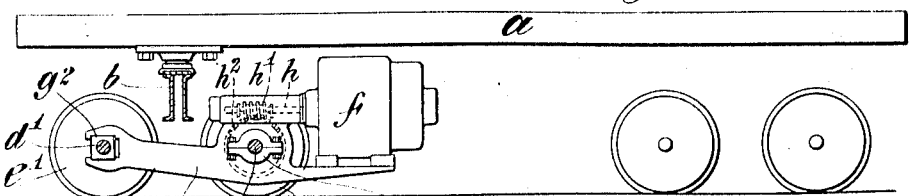

Figure 1 is a view partly in elevation and partly in section showing a portion of a railway car with the improved motor truck in place. Fig. 2 is a top view of the motor truck shown in Fig. 1. Fig. 3 is a view in elevation, partly in section, on a smaller scale than Figs. 1 and 2, indicating the whole of the car body and both a motor truck and a carrying truck.

In the embodiment of the invention represented in the drawing the car body $a$ is shown as supported upon the bolster $b$ of the truck. The bolster is secured to the side frames $c$ and the latter may be provided with journal boxes, not shown, for the axles $d$, $d'$, provided with the driving wheels $e$, $e$, and the carrying wheels $e'$, $e'$ respectively. The motor $f$, which may be of any suitable character, is mounted upon one end of a frame $g$ which has two journal boxes $g'$ to receive the driving axle $d$. The other end of the frame $g$ is suitably supported so that the weight of the motor acts upon the driving axle $d$ with an increased leverage. Obviously such other end of the frame may be supported by any suitable means. As shown in the drawing it is supported upon the carrying axle $d'$, having a single, centrally disposed journal box $g^2$ to receive the carrying axle. The motor may be geared to the driving axle $d$ in any convenient manner. As shown in Figs. 1 and 2 a worm $h'$ on the armature shaft $h$ of the motor engages a worm gear $h^2$ fixed on the driving axle $d$.

It will now be seen that the motor frame has a three point bearing, two points on the driving axle and one point (in the construction shown) on the carrying axle, so that the truck has the necessary flexibility while the motor is maintained always in definite relation to the driving axle. Furthermore with the extension of the motor frame in one direction, beyond the driving axle $d$, away from the carrying axle $d'$ or point of support of the other end of the frame $g$, to receive and support the motor, nearly all of the weight of the truck, motor frame, motor and a corresponding portion of the car body is supported directly upon the driving wheels $e$ so that an increased tractive effort is produced, the carrying wheels $e'$ sustaining only so much of the weight as is necessary to keep them upon the rails.

It will be understood that the details of construction and arrangement may be varied to suit different conditions of use and that the invention is not restricted to the particular construction shown and described herein.

It will also be understood that although the invention is shown in the drawings as applied to an eight wheel car, it is equally applicable to a four wheel car, the word "truck" being used with a broad signification.

I claim as my invention:

A motor truck comprising a driving axle and wheels, a carrying axle and wheels, a truck frame, a single motor frame independent of said truck frame having a two point bearing on the driving axle and a one point bearing on the carrying axle and extended beyond the driving axle away from the carrying axle, a motor mounted upon the extension whereby the weight of the motor acts upon the driving axle with a maximum leverage, said motor being geared to the driving axle.

This specification signed and witnessed this 27th day of December, A. D., 1910.

CHAS. W. HUNT.

Signed in the presence of—
CHARLES HUMPHREY,
W. L. VOORHIS.